(12) United States Patent
Schreier

(10) Patent No.: US 9,262,840 B2
(45) Date of Patent: Feb. 16, 2016

(54) OPTICAL NON-CONTACTING APPARATUS FOR SHAPE AND DEFORMATION MEASUREMENT OF VIBRATING OBJECTS USING IMAGE ANALYSIS METHODOLOGY

(71) Applicant: Correlated Solutions, Inc., Columbia, SC (US)

(72) Inventor: Hubert W. Schreier, Columbia, SC (US)

(73) Assignee: Correlated Solutions, Inc., Columbia, SC (US)

( * ) Notice: Subject to any disclaimer, the term of this patent is extended or adjusted under 35 U.S.C. 154(b) by 138 days.

(21) Appl. No.: 13/913,957

(22) Filed: Jun. 10, 2013

(65) Prior Publication Data

US 2013/0329953 A1    Dec. 12, 2013

Related U.S. Application Data

(60) Provisional application No. 61/657,162, filed on Jun. 8, 2012.

(51) Int. Cl.
*G06K 9/00* (2006.01)
*G06T 7/20* (2006.01)
*G06T 7/00* (2006.01)

(52) U.S. Cl.
CPC ............. *G06T 7/2093* (2013.01); *G06T 7/0071* (2013.01); *G06T 2207/10021* (2013.01); *G06T 2207/10144* (2013.01); *G06T 2207/10152* (2013.01); *G06T 2207/20056* (2013.01); *G06T 2207/30164* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,067,160 A * | 11/1991 | Omata et al. | ................... | 382/107 |
| 5,307,170 A * | 4/1994 | Itsumi et al. | ................ | 348/219.1 |
| 6,134,006 A * | 10/2000 | Telschow et al. | ............. | 356/503 |
| 6,175,411 B1 * | 1/2001 | Telschow et al. | ............. | 356/503 |
| 6,215,897 B1 | 4/2001 | Beer et al. | | |
| 7,027,353 B2 * | 4/2006 | Melese et al. | ...................... | 367/7 |
| 7,753,847 B2 * | 7/2010 | Greenleaf et al. | ............. | 600/438 |
| 2003/0164045 A1 | 9/2003 | Argento et al. | | |
| 2005/0279172 A1 * | 12/2005 | Schreier et al. | ................. | 73/657 |
| 2007/0071652 A1 | 3/2007 | Cherng et al. | | |
| 2010/0135591 A1 * | 6/2010 | Zador | ........................... | 382/255 |
| 2012/0019654 A1 * | 1/2012 | Venkatesan et al. | .......... | 348/142 |

FOREIGN PATENT DOCUMENTS

WO    2005/067257 A1    7/2005

OTHER PUBLICATIONS

International Search Report and Written Opinion of PCT/US13/44975 mailed Dec. 23, 2013.

* cited by examiner

*Primary Examiner* — Anand Bhatnagar
(74) *Attorney, Agent, or Firm* — Nelson Mullins Riley & Scarborough, LLP

(57) ABSTRACT

Apparatuses and methods related to measuring motion or deformations of vibrating objects are provided. A plurality of images of an object are acquired in synchronization with a plurality of determined times of interest during oscillation of the object. The plurality of images are compared to obtain one or more quantities of interest of the object based at least in part on the plurality of images.

48 Claims, 10 Drawing Sheets

OPTICAL NON-CONTACTING APPARATUS FOR SHAPE AND DEFORMATION MEASUREMENT OF VIBRATING OBJECTS USING IMAGE ANALYSIS METHODOLOGY

CROSS-REFERENCE TO RELATED APPLICATIONS

The present Application for Patent claims priority to Provisional Application No. 61/657,162, entitled "OPTICAL NON-CONTACT DEFORMATION DETECTION APPARATUS" and filed Jun. 8, 2012, which is expressly incorporated by reference herein for all purposes.

TECHNICAL FIELD

Aspects described herein relate generally to the visualization and measurement of object shape and deformation. More specifically, aspects relate to an apparatus and method for visualization and measurement of object shape and deformation of vibrating objects employing synchronized image acquisition, variable exposure time, and image recording and analysis.

BACKGROUND

It is well-known that oscillations (vibrations) of objects are measured using sensors such as accelerometers, linear velocity displacement transducers and displacement gauges. These methods measure motions locally at a few discrete locations through contact with the surface. Due to their mass, such sensors can affect the response of the object being measured.

In addition to the effects of mass on the response of an object, such methods typically measure object motions and deformations only along a specific direction and at discrete points. To obtain measurements of motion in all directions at a point, either a combination of several sensors located at the same point or a combination of several experiments with sensors oriented in distinct directions at the same point is required to obtain all of the motion components at a given point. Even if multiple sensors are used, a measurement of the deformations of the object surface caused by the oscillations cannot be determined using motion data at a single position since the gradients of the deformation may also be required. Due to the size and weight of these sensors, it is not possible to place additional sensors sufficiently near the same point to acquire accurate measurements of the surface deformations.

These deficiencies have led to the development of optical non-contacting measurements. Optical measurement methods do not contact the surface and as such do not affect the response of the object. In one such method, laser vibrometers are capable of acquiring motion measurements for vibrating objects without contacting the surface. In its standard form, a laser vibrometer acquires measurements at one point.

A scanning laser vibrometer can operate in a manner that scans across the object, acquiring motion measurements at several positions on the object surface. A disadvantage of the method is that the scan time increases according to the density of the measuring points. A further disadvantage of any scanning laser vibrometer is the missing reference to an object point for the measurement of relative object motions between points on the object surface. The primary quantity measured by laser vibrometers is the relative phase change and/or the rate of change due to the optical path length variation induced by object surface motions. The sensitivity direction is given by the combination of illumination and observation angle. That is, measurements are made along a line of sight without direct reference to a fixed object point. Therefore, a measurement of the relative motion of two object points is impossible and strain measurements cannot be obtained in the general case. A further disadvantage are the high costs due to the use of expensive optical components, coherent light sources, vibration isolation components, and the requirements to have a highly reflective object surface during the measurement process.

Additional non-contacting measurement methods include Speckle interferometry, such as speckle holography or speckle shearography, used to obtain full-field (total visible surface) motion measurements during object vibrations and/or oscillations. These methods can provide a direct reference to the object surface and thus, determination of object strains is possible. A major disadvantage of these procedures is that the coherent illumination and measurement process can only be used to measure small object motions due to the high sensitivity of interferometric methods. Additional disadvantages include the deleterious effects of: (a) small environment disturbances; and (b) rigid body motion of the object relative to the recording medium. A further disadvantage is the high cost due to the use of expensive optical components and coherent light sources.

Yet another non-contacting measurement method includes digital speckle photography or digital image correlation originally developed to measure the 2D deformations of an object subjected to a change in loading (i.e. static loading change). The method stores images of a randomly varying intensity pattern in the two loading states and uses software to compare sub-regions in each pattern to extract full-field measurements of surface displacement. When combined with multiple cameras and appropriate mathematical formulation, the method is capable of determining full field 3D surface motions. The random pattern provides a locally unique set of markers to allow for determination of correspondences between many small sub-sets within the image so that it is possible to measure a full-field of local surface deformations. Known as a speckle pattern, the randomly varying intensity field may be naturally occurring or artificially applied.

SUMMARY

The following presents a simplified summary of one or more aspects to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

According to one embodiment, a procedure is provided for the visualization and measurement of deformations of vibrating objects by using synchronized imaging of an object in a manner that freezes each image in time. After conversion of the images into digital form, image comparison procedures are performed to obtain quantities of interest (such as full-field object motions, 3D shape of a vibrating object, or relative object motions, for example).

In some embodiments, the images may be frozen in time or otherwise captured using exposure time control by digital image recording devices, such as charge-coupled device (CCD) cameras, complementary metal-oxide-semiconductor (CMOS) cameras, or other technologies. Also, the images may be stored in digital form for evaluation using image comparison procedures to obtain full-field quantities of interest. In another embodiment, the images may be frozen in time or otherwise captured using illumination control (e.g., stroboscopic illumination control) where timing and duration of illumination pulses are synchronized (e.g., with the image acquisition). Further, other embodiments may employ both reduced exposure time control and illumination control by using a synchronization unit that provides triggering signals to control both the timing and duration of reduced exposure and illumination pulses.

Another embodiment provides for patterning of an object surface for use in extracting object motions and object deformations. For example, the object surface may have a characteristic image pattern that may be used to identify common object points in various phase-shifted images through image processing (e.g., image comparison or matching mechanisms). The pattern may have a random variation in contrast and/or intensity across an object's surface (e.g., a speckle pattern), or a non-random pattern, and may occur naturally on the object or applied by artificial preparation.

Further embodiments provide methods for real-time visualization and control of the measurement process. For example, determination of the periodic response for a quantity of interest may be performed in a relatively short time so that the time history of quantities (such as the peak-to-peak swing, phase, etc.) may be computed rapidly. The results may be used to perform real-time identification of important states of the object, including conditions such as vibratory resonance, mode shapes, and maximal strain ranges. Real-time data may be used for automatic active control of the external excitation frequency via the synchronization unit. The automatic active control may be used to optimize specific input quantities for the excitation, such as force, direction, timing, etc. Additionally, automatic active control may be used to visit the local maxima or minima in quantities of interest, such as amplitude of object response, maximum normal strain, etc. Further, the criterion for the automatic or manual search of the resonant frequency may employ gradients with respect to frequency (e.g., dA/df and/or dP/df, where A is the amplitude of the object motion and P is the applied external force).

A still further embodiment provides a procedure for visualization of object motions and deformations on the vibrating objects. When the periodic response as a function of phase has been determined, special emphasis may be placed on the reversal points (e.g., at maximum amplitude or minimum amplitude where the object speed is low). At these locations, images may be analyzed and presented to the user for visual "stroboscopic" observation of the object motions and identification of modal shape. Similar presentations of data may be performed for surface strains, velocities, accelerations and other quantities of interest.

Another embodiment allows for inputting transient loads (e.g., via tapping with instrumented impact hammer) on an object, and then acquiring a multiplicity of images of the object during the transient vibrations. For example, the multiple images can be obtained using a plurality of high speed cameras positioned to acquire the images of the object, and post-processing of the images can utilize frequency analysis to extract a range of vibration modes (e.g., mode shapes) or other quantities of interest.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements.

DETAILED DESCRIPTION

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

In general, embodiments described herein relate to a system and method for measuring and visualizing the mode shapes, motions, deformations, etc. of an object undergoing vibration or oscillation. Some example embodiments may combine image acquisition methods with digital image correlation (e.g., 3D digital image correlation), or other image analysis methods, such as marker tracking, etc. By using image recording mechanisms (e.g., stroboscopic mechanisms) and/or reduced exposure time during image acquisition, sharp images of a vibrating object can be acquired and analyzed to obtain the object motions. Other derived quantities, such as vibration amplitudes, phase maps, surface strains, etc. can then be obtained from the object motions.

Embodiments described herein may be implemented as Vibro-Correlation Systems (VIC-S), which may be used for vibration measurements according to a phase resonance method. Moreover, the terms vibration and oscillation may be used interchangeably herein and are intended to each include both oscillation and vibration.

Figure 1:
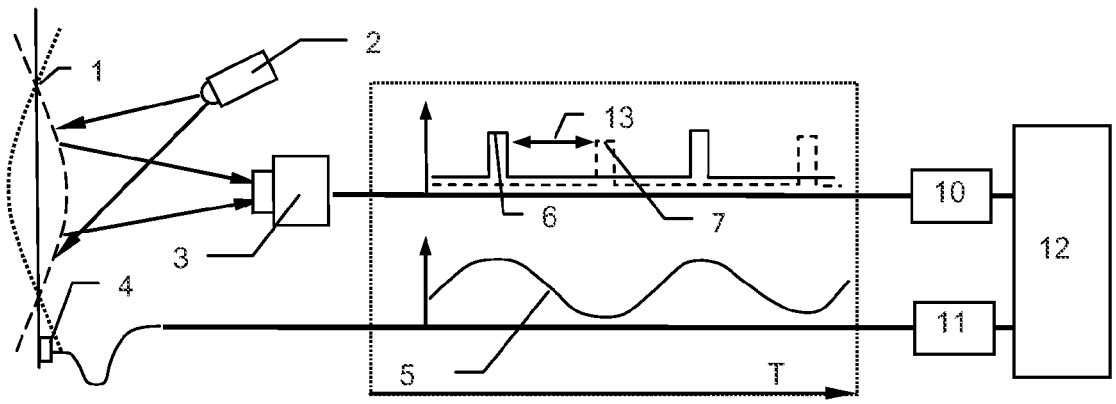
FIG. 1 is a schematic representation of an image acquisition system having continuous illumination with controlled application of reduced exposure times constructed in accordance with aspects described herein.
Figure 2:
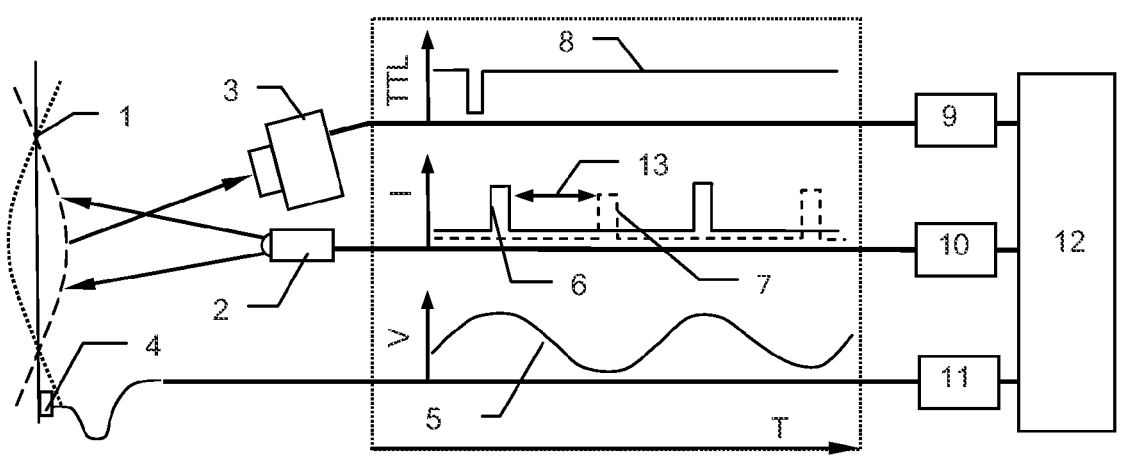
FIG. 2 is a schematic representation of an image acquisition system having controlled illumination for adequate exposure constructed in accordance with aspects described herein.

In this regard, FIGS. 1 and 2 are schematic illustrations of VIC-S arrangements in accordance with certain embodiments. The VIC-S may measure full-field surface positions of an object 1. A synchronization unit 12 may obtain images of the vibrating object surface with image recording device 3 (which may include multiple image recording devices) by triggering an instant when an image is recorded based on periodic oscillations or other movements applied to object 1. More particularly, in FIG. 1, illuminating device 2 (which may include multiple illuminating devices) may provide uniform illumination of object 1 while synchronization unit 12 sends a trigger signal 10 to image recording device 3. The trigger signal 10, in an example, can have rectangular pulses 6, 7 according to a selectable time interval 13. In one example, illuminating device 2 may provide continuous illumination with reduced image exposure times controlled by rectangular pulses 6, 7 of trigger signal 10. In FIG. 2, illuminating device 2 may comprise one or more stroboscopic units that may be activated via the trigger signal 10, which can again have rectangular pulse(s) 6, 7 at specified times, from synchronization unit 12. Synchronization unit 12 may also send a trigger signal 9, which may have appropriately synchronized rectangular pulse(s) 8, to image recording device 3 and record images during appropriate lighting times provided by illuminating device 2. The combination of such controls on lighting and/or image recording can provide a recorded image that is essentially frozen in time. The images may then be analyzed using image comparison procedures (see, e.g., FIG. 4 for an example using a speckle pattern) to extract full-field object response, including surface shape, deformations, phase response, etc. of the object 1 as a function of time.

Figure 5:
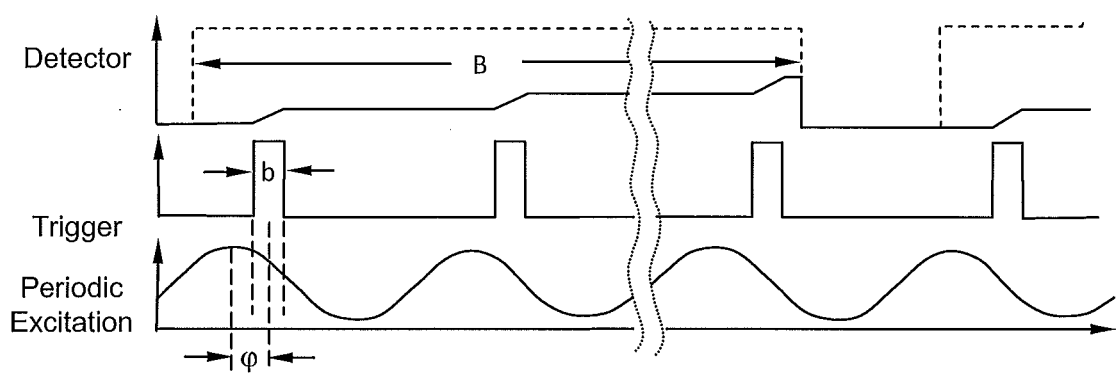
FIG. 5 is an exemplary graph illustrating control of exposure time or illumination to extract phase response from separate excitation cycles according to aspects described herein.

Considering a specific applied frequency of oscillation, several well-focused, sharp images may be acquired that correspond to various times during a cycle of periodic oscillation of object 1 by slightly shifting the phase of the periodic lighting and/or the exposure time sequence (see, e.g., locations identified by b with phase shift of φ in FIG. 5). After recording multiple images of the vibrating object, 3D digital image correlation procedures may be used to obtain the full-field object motions and the surface strains. Furthermore, by selecting any two images from the image sequence, quantities of interest may be obtained, such as: (a) peak-to-peak relative motions of the object 1 (for example based on rectangular pulses 6 or 7 having a relative phase position 13 in trigger signal 10 of FIG. 1); (b) the phase at various positions P on the object (for example φ(P), as defined in FIG. 5); and (c) the frequency response and the surface deformations (e.g., surface strains) on the object 1 surface for the specific applied frequency of oscillation. This may mitigate the need for high-speed image acquisition while reconstructing the full-field motions and phase response of the object.

It is to be appreciated that by repeatedly using a range of frequencies for oscillating the object, and by using appropriate shifting in acquiring the multiple images, the response of the object 1 and the modal shapes that are present can be quantified while performing frequency analysis of the data to reconstruct the response of the specimen. Example frequency analysis methods can include Fast Fourier Transforms (FFT) and/or additional methods used to quantify the frequency content in the data.

It is to be appreciated that some or all of the steps described above and further herein may be repeated for any/each/all applied frequencies of oscillation to obtain the entire frequency response of the object 1.

Certain aspects described herein may be implemented as a method, apparatus, or article of manufacture using standard programming and/or engineering techniques to produce software, firmware, hardware, or any combination thereof to control a computer to implement the aspects. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it is to be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the subject matter.

Moreover, the term or is intended to mean an inclusive or rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and an as used in this application and the appended claims should generally be construed to mean one or more unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 3:
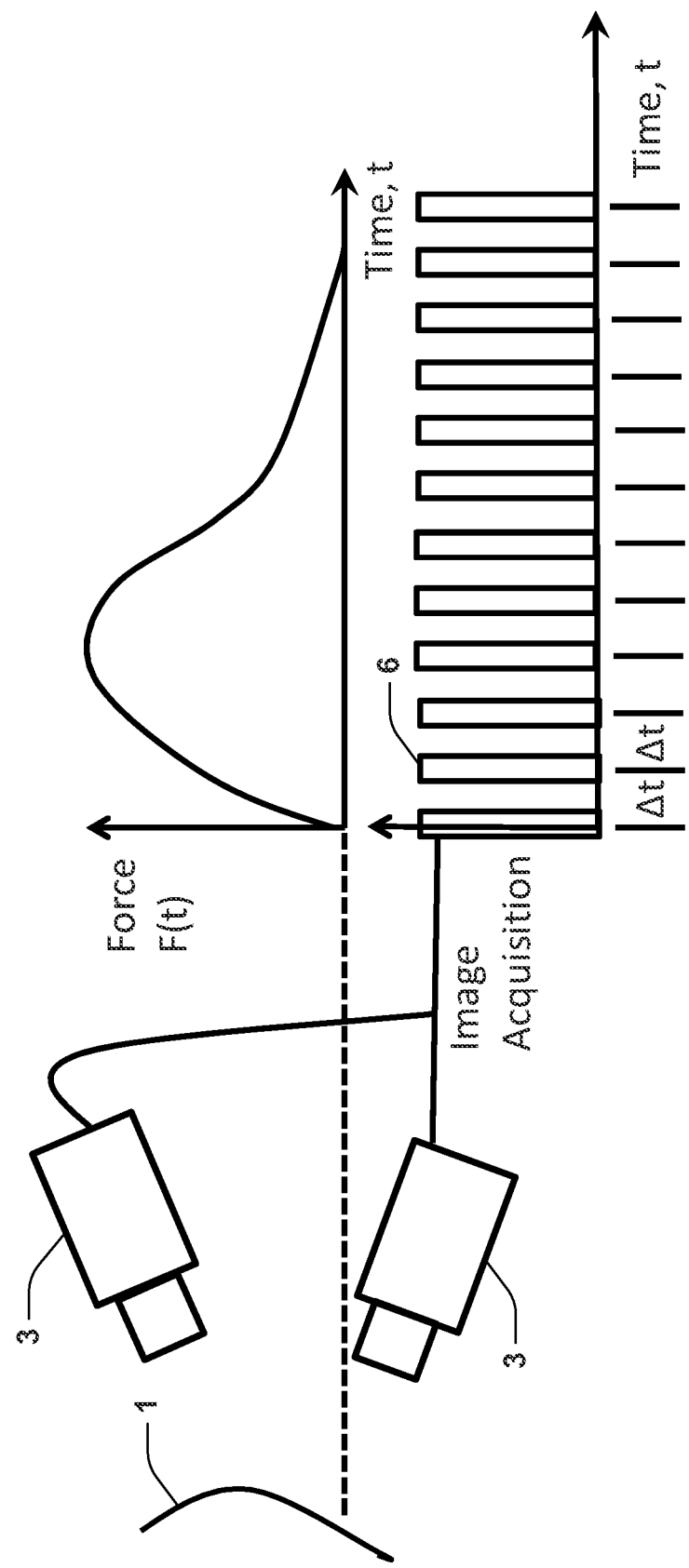
FIG. 3 is a schematic representation of an image acquisition system for acquiring images based on a transient impulse.

FIG. 1 is a schematic representation of an image acquisition system having continuous illumination with controlled application of reduced exposure times constructed in accordance with one or more example embodiments. FIG. 2 is a schematic representation of an image acquisition system having controlled illumination (e.g., stroboscopic illumination) for adequate exposure constructed in accordance with an example embodiment. In general, any object oscillation process may be applied to induce vibratory motion of object 1. Then, the object surface motion may be optically frozen at any place and/or oscillation phase position, so that well-focused, sharp images of the object may be acquired, as described further herein. FIG. 3 is a schematic representation of an image acquisition system with multiple cameras that uses impulses to effectuate transient loads on the object 1 measure mode shape of an object 1.

Figure 4:
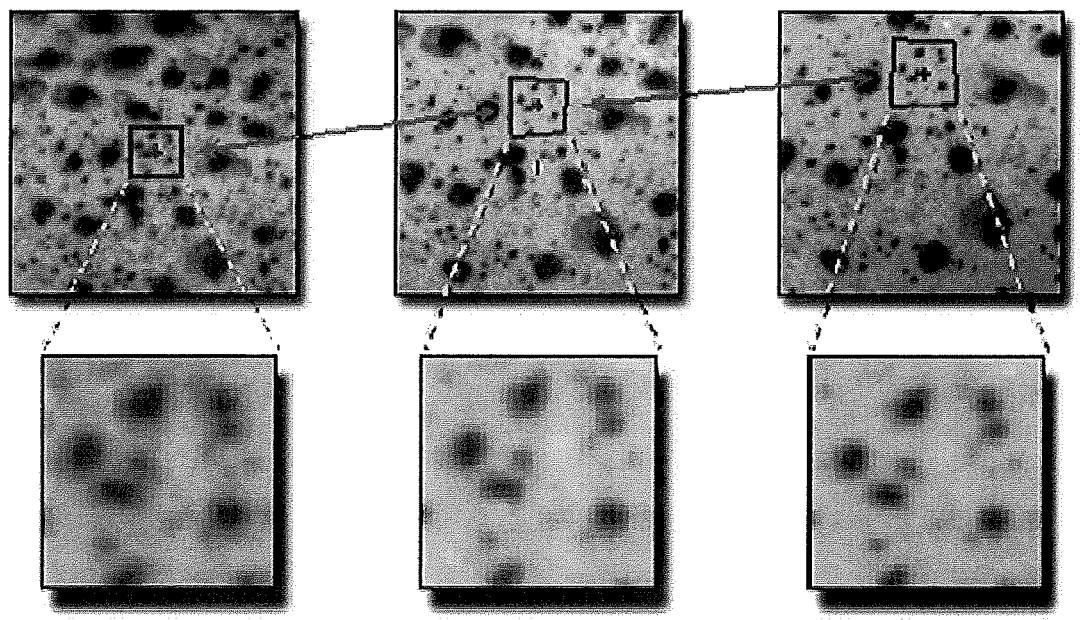
FIG. 4 is an exemplary series of images which illustrate comparison of a speckle pattern on an object in accordance with aspects described herein.
Figure 6:
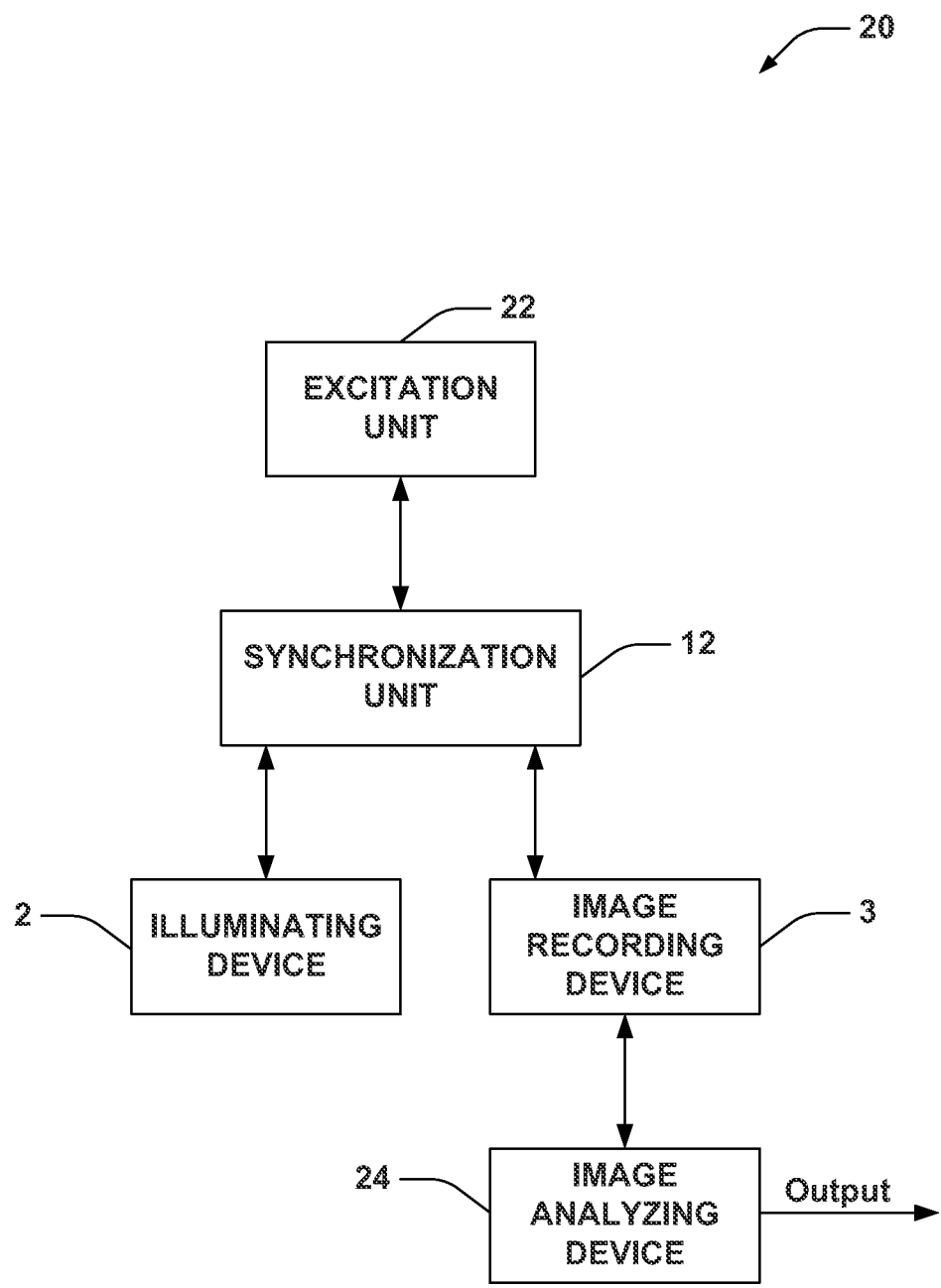
FIG. 6 is an exemplary aspect of an example system for analyzing images acquired of an object based on oscillation of the object.

FIG. 4 illustrates example speckle patterns that can be used on objects 1 to facilitate acquiring images and processing the images to determine motion, deformation, etc. FIG. 5 is an exemplary graph illustrating control of exposure time or stroboscopic illumination to extract phase response from separate excitation cycles. FIG. 6 illustrates an example system 20 in accordance with certain aspects described herein. System 20 includes an illuminating device 2 to illuminate an object, as described, herein, an image recording device 3 to acquire images of the object, and a synchronization unit 12 to synchronize at least the image recording device 3 and/or the illuminating device 2 with one or more periods of interest of an excitation unit 22. The excitation unit 22 can oscillate, vibrate, or otherwise move an object, such as object 1. For example, the excitation unit 22 can include an oscillator, exciter, or substantially any apparatus that vibrates or otherwise moves object 1 (e.g., according to a regular or random pattern, a transient pattern based on a transient impulse, and/or the like), and/or can comprise one or more such units. In one example, the excitation unit 22 can include an impact hammer or other mechanism for applying transient loads on the object 1.

As described further herein, the synchronization unit 12 can determine one or more parameters regarding oscillations or other excitation performed by the excitation unit 22 (e.g., a time of interest related to an occurrence of an oscillation or related pattern or specific movement begins or occurs, a force, direction, etc. of an oscillation or other movement, and/or the like), and can use this information to accordingly synchronize image recording device 3 and/or illuminating device 2 actions with the oscillation or other movement. In an example, the one or more parameters can be measured by a sensor 4 deployed between the excitation unit 22 and synchronization unit 12 that receives the parameters from the excitation unit 22 or otherwise observes the parameters based on actions by the excitation unit 22.

System 20 also includes an image analyzing device 24 for performing one or more image analysis processes on images acquired by image recording device 3 to obtain some sort of output. As described further herein, for example, image analyzing device 24 can perform image comparison to determine the quantities of interest defined herein, which may include motion or deformation of an object 1, and can generate output data indicative of object motion or deformation, etc. Moreover, in some examples, image analyzing device 24 can perform additional functions. It is to be appreciated that the various units, devices, or other components of the systems described herein can be located near one another, located in a common device or apparatus, remotely located and communicating over a network or other medium, and/or the like. Moreover, in some examples, one or more of the various units, devices, etc. can be implemented at least partially by a computing device, as described further herein.

Example Optical Freezing

The optical freezing process may be realized in various ways in accordance with some embodiments. As shown in FIG. 1, one approach may be to continuously illuminate the object surface using illuminating device 2 and use synchronization unit 12 to perform synchronization of the image acquisition process at each time of interest during the oscillation process with short exposure time. The reduced exposure time may be controlled by rectangular pulses 6, 7 of trigger signal 10. As shown in FIGS. 2 and 5, another approach may employ control of object illumination. In these examples, synchronization unit 12 may control illuminating device 2 via trigger signal 10 to illuminate the object 1 at, or based on, each time of interest. In another example, the trigger signal 10 can be based on the trigger signal 9 sent to the image recording device 3. Another approach may use a combination of both reduced exposure time and stroboscopic illumination. For example, synchronization unit 12 can select or otherwise send the trigger signal 9 and/or 10 with a pulse width of pulses 6, 7, and/or 8 to specify a duration for the illumination and/or exposure time.

It is noted that, because the optical freezing process can be used for general excitation, it also may be used to freeze the motion when object 1 is subjected to oscillation frequencies that result in resonance conditions.

Example Imaging Components

In one embodiment, image recording device 3 used for the image acquisition and recording process may be, or may include, one or more charge-coupled device (CCD) cameras, complementary metal-oxide-semiconductor (CMOS) cameras, or other systems that convert the image into digital form. In some embodiments, such as transient impulse motion (e.g., hammer-strike), high speed cameras may be used to obtain data across several cycles for detailed analysis.

Example Imaging System

One or more types of imaging systems may be used as well, including stereo camera systems, whereby the image planes of multiple cameras in the stereo system are directed toward the object from different directions. Due to the different views obtained by the cameras (e.g., image recording device 3), triangulation procedures may be used to determine the three-dimensional positions of the total surface at any time. Image analyzing device 24 or other devices can perform image processing to determine the slopes and curvatures of the surface at substantially any position on the object surface. In another embodiment, multiple cameras may be used in the stereo camera system, with some or all of the image planes being parallel to each other and the cameras shifted relative to each other (parallel sensor planes).

Example Image Acquisition Synchronization

In some embodiments, synchronization unit 12 may select the time for recording of a frozen image, and can indicate the time via a trigger signal 10 used to trigger the image acquisition process (e.g., by selecting a time for sending pulses 6, 7 of the signal 10). Trigger signal 10 indicates the time at which an image is recorded so that images can be acquired with arbitrary phase position, $\phi$, relative to an excitation signal of an excitation unit 22 that oscillates object 1. Because trigger signals 10 may be sent at any time, trigger signals 10 can be shifted in time to record data at the same phase location after N additional cycles of oscillation have elapsed. FIG. 5 is an exemplary graph illustrating this process according to an example embodiment. In this case, the phase of the recorded images is shifted by $2\pi N+\phi$, where N is the number of cycles of oscillation that have elapsed since the previous recorded image. In this manner, images may not have to be acquired all within a single cycle of oscillation, and relatively small image acquisition rates may be sufficient to reconstruct the complete phase history of the periodic oscillation.

In one embodiment, the frequency of the outgoing trigger signal 10 from the synchronization unit 12 may be selected in such a way that it can be represented as the quotient of the frequency of the vibrating object 1 and a divisor (including the divisor=1). By selecting divisors greater than unity, triggering for image acquisition across many cycles is possible and need not necessarily occur within a single oscillation. Thus, relatively slow image acquisition rates and/or low flash frequencies may be sufficient to freeze images and obtain images that image analyzing device 24 can use to reconstruct the phase response at a relative phase shift to represent the profile, stretches, and distortions during oscillation of object 1.

Example Trigger Signal Sources

In one example, a motion sensing device 4 may be used to sense the input periodic excitation of object 1 in real-time, and can send a signal 11 to synchronization unit 12 representative of the excitation. In some examples, the motion sensing device 4 may comprise or otherwise be coupled to the excitation unit 22 that oscillates the object 1. Motion sensing device 4 can be coupled thereto to receive information regarding oscillating movements of the excitation unit 22, to sense oscillations based on movement, etc. In other examples, motion sensing device 4 can be separate from the excitation unit 22 and can otherwise observe movement by the excitation unit 22, or otherwise of the object 1. For instance, in this example, motion sensing device 4 may comprise optical components to detect the movements. In any case, synchronization unit 12 can receive the signal 11 from the motion sensing device 4 indicative of excitation of the object 1, such as an occurrence of excitation (e.g., a time of interest), and can automatically adjust synchronization for the triggering signals 9 and/or 10 based at least in part on the signal 11. As shown in FIGS. 1 and 2, signal 11 preferably comprises information representative of periodic oscillations 5 of object 1. Once received, synchronization unit 12 may provide trigger signals 9 or 10 to the image recording device 3 and/or illuminating device 2 (e.g., the stroboscopic unit FIG. 2) that reflect changes in the oscillation frequency and phase.

In additional embodiments where motion sensing device 4 may not exist, or may be part of the excitation unit 22, a signal can be received from the excitation unit 22 indicative of current or future excitations to be applied to the object 1. In one example, the synchronization unit 12 can receive an existing synchronization signal, or a signal generated therefrom, from the excitation unit 22 so that trigger signals 10 from synchronization unit 12 reflect the input oscillating frequency and phase.

In another embodiment, the frequency of the input oscillation may not be measured. For instance, the synchronization unit 12 may produce a periodic signal (not shown) for input directly into the excitation unit 22 to control oscillation of the object 1 (e.g., during determined times of interest). The synchronization unit 12 may then also accordingly generate the trigger signals 9 or 10 to provide the image acquisition and/or illumination based on the produced periodic signal to control the excitation unit 22. In one example, the synchronization unit 12 can trigger signals 9 or 10 such that the frequency and phase thereof may be in direct correspondence with the excitation. In one example, the periodic signal to control the excitation unit 22 can be of arbitrary form and frequency, a default or manually set excitation frequency, etc. In any case, in this example, input signals or analyses of measured oscillations are not needed to generate the trigger signals 9 or 10. Further, in other embodiments, the synchronization unit 12 can sequentially apply incremental phase shifts to one or more of the trigger signals 9 or 10 so that images may be acquired at discrete, specified phase shifts.

Regardless of the approach used to determine the excitation frequency, the signal 11 received by synchronization unit 12 may be analyzed to determine the primary periodic frequency component. The synchronization unit 12 may use this information to define the relative phase position (e.g., phase position 13) of the output trigger signals 9 or 10.

Example Use of Trigger Signal

As noted previously, synchronization unit 12 may use trigger signal 9 and/or 10 to initiate the optical freezing of the object 1 or a portion thereof by: (a) signaling the electronic imaging system (e.g., image recording device 3) to expose an image via rectangular pulses 6, 7 having relative phase positions 13 in trigger signal 10 of FIG. 1; (b) signaling the lighting system (e.g., illuminating device 2) to flash for a designated period of time via rectangular pulses 6, 7 having relative phase positions 13 in trigger signal 10 of FIG. 2; and/or (c) signaling both the electronic imaging system(s) and the lighting system(s) so that the combination works together (e.g., by using corresponding trigger signals 9 and 10) to freeze the image.

Example Exposure and Illumination Time

In electronic imaging systems, the exposure time may be varied at the image plane by a range of shuttering methods, including electronic, mechanical, and optical shutters. The shuttering method determines the length of the integration and/or exposure time of the camera required to obtain good quality images with sufficient contrast and without motion blur. For example, the exposure time can be specific to, and/or configured by, the image recording device 3, specified by the trigger signal 10 (e.g., by a pulse width of pulses 6 or 7 in FIG. 1), and/or the like.

Similarly, the illumination time may be represented, for example, by the pulse width of rectangular pulses 6, 7 in trigger signal 10 of FIG. 2. There are many illumination systems with adjustable illumination times (e.g., stroboscopic illumination) that may be triggered to freeze an image. In each case, the illumination interval may preferably be adjusted to obtain good quality images. It is to be appreciated, however, that the illumination time can be constant, or can be controlled by the image recording device 3, etc.

In certain situations, a single light strobe from illuminating device 2 may not provide sufficient intensity for acquiring an image of the object 1, and the electronic shutter time of the image recording device 3 may be too high to freeze the object motion. In these cases, synchronization unit 12 may be used to trigger multiple light strobes of the illuminating device 2 or multiple illuminating devices 2 at substantially identical phase angles and over multiple vibration cycles while the image recording device 3 or multiple image recording devices 3 expose. Here, each image recorded may be the integration of the individual flashes by using appropriate exposure time of the image recording device or devices 3. In this regard, as noted above, FIG. 5 represents an exemplary graph illustrating control of exposure time or stroboscopic illumination by the synchronization unit 12 to extract phase response from separate excitation cycles according to one embodiment.

Example Image Filtering

In an additional aspect of some embodiments, image recording device 3 may suppress background radiation/lighting during the image acquisition process using optical filters coordinated with the lighting frequency. For example, image recording device 3 may use interference filters, such as bandpass filters, for this purpose.

Example Patterning of Object Surface

In many embodiments, a surface of object 1 can define a characteristic image pattern which may be used to identify the object points in the recorded images through one or more image matching processes. In one embodiment, the pattern may have a random variation across the visible surface of object 1. Such a random variation is known as a speckle pattern, as shown for example in FIG. 4.

In one embodiment, the speckle pattern may occur naturally on the surface due to characteristic marks or surface features of object 1. Natural patterns may include wood grain, metal surface texture, metal microstructure features, skin texture, masonry surface features, carpet color variations, and plastic surface color and texture variations. In another embodiment, artificial object preparation may be performed to bond a speckle pattern to the object surface. Artificial preparation methods may include spray painting, hand painting, and paint splattering to obtain a speckle pattern on a homogeneous background. In other embodiments, a non-random pattern may be applied across the visible object surface for use in pattern matching or other identification. Example patterns include line grids, crossed line grids, an array of dots or other symbols. Additionally, a combination of random and non-random patterns may be applied to the visible surface of the object. In any case, image analyzing device 24 can detect and/or observe the recognized patterns across the plurality of images to track movement, motion, deformation, acceleration, velocity, etc. of the object 1 using one or more image correlation mechanisms.

Example Extraction of Object Motions from Image Data

In one embodiment, image recording device 3 may comprise a calibrated stereo camera system. The calibrated stereo camera system may be used to acquire simultaneous images of object 1 from different viewing angles to provide for extraction of object shape, object motion, object deformations, etc. from images at each of multiple times of interest. Image analyzing device 24 can use image recognition, pattern matching, and/or other correlation methods known to identify and/or track corresponding subsets of points (or "speckles") on the patterned surface of object 1 in each of the stereo images of the object 1 surface.

For example, FIG. 4 shows an exemplary series of images which illustrate comparison of a random or non-random pattern on an object in accordance with an embodiment. Then, for each phase shift, image analyzing device 24 can use one or more triangulation methods to determine the three-dimensional position of each point or subset of points on the object surface. For example, image analyzing device 24 can use digital image correlation methods to match points and/or subsets throughout the full-field within the images. Using this procedure, image analyzing device 24 can perform full-field measurement of the amplitude and phase of the object motion during the oscillation process. Moreover, as described, image analyzing device 24 can generate an associated output, which can be used to determine full-field motion, phase shifts, deformation or distortions, acceleration, etc. of the object 1.

Example Camera Calibration

In an example embodiment, performing a calibration process for the stereo camera system that considers and removes the effects of image distortion may allow for a more accurate determination of full-field spatial amplitude and phase. Here, calibration can include optimal estimation of camera and distortion model parameters, as well as the determination of the relative position of multiple cameras. There is a wide variety of suitable calibration procedures. The calibration process typically comprises acquiring one or more images of a calibration target using one or more of image recording device(s) 3.

One example calibration procedure uses multiple images of the calibration target in different orientations (e.g., using each of the image recording device(s) 3) and may employ a bundle-adjustment method, or other image comparing and reconciling method, to solve the resulting mathematical equations for camera parameters, distortion coefficients, and camera orientation for each of the image recording device(s) 3. Additionally, the calibration process may employ several arbitrary, three-dimensional rigid body motions of a grid or feature pattern and known procedures to determine the model parameters for each of the image recording device(s) 3 the stereo camera system. Also, the calibration process may employ calibration plates with speckle patterns, and the calibration process may use estimated rigid body motions. Further, the calibration process may employ calibration plates with either a grid or feature pattern having estimated relative spacing, and rigid body motions may be performed with these patterns. In another embodiment, an object having estimated dimensions may be subjected to rigid body motions.

Example Object Motion Determination

In one embodiment, image analyzing device 24 may be employed to analyze the images acquired by image recording device 3 (e.g., calibrated stereo or other cameras) during vibration of the object 1 and determine the full-field motion, phase maps, deformations, and strains of the object, as described, based at least in part on the images. As described, image analyzing device 24 can determine the motion, phase maps, deformations, strains, etc. based at least in part on tracking movement of patterns on the object 1 in images from one or more image recording devices 3. Once determined, in an example, image analyzing device 24 can convert the full-field motions into a coordinate system that may be aligned with an appropriate local object 1 outline, a surface-normal of the object 1, etc. Once converted into the local system, in an example, image analyzing device 24, or another device, may convert the object motions into local measures of relative motion (e.g., relative 3D object motions, such as strain of the object surface), local measures of surface deformation, etc. for subsequent use in analyzing object 1 motion.

In another embodiment, image recording device 3 can acquire images of the patterned object surface in a state of rest (e.g., without trigger measures). Image analyzing device 24 may use these images as a "reference state" during the determination of object motions, deformations, etc., in one example, wherein object motions, deformations, etc. may be determined relative to the "reference state."

Moreover, for example, image analyzing device 24 can use high speed 2D digital image correlation using a high speed camera as image recording device 3 and the concepts of 2D digital image correlation to acquire images of a planar object surface at various times along with mechanisms to extract 2D full-field object motions at each time. In other examples, image analyzing device 24 can use high-speed stereo speckle photography or 3D digital image correlation where multiple high speed cameras as image recording device 3 simultaneously record digital images of the object surface, as described, at each time, t, and mechanisms are used to extract 3D full-field object motions at each time. For example, using such high speed cameras for image and recording device 3 can provide unique capability to acquire images at high rates so that even fast vibratory events can be captured using such systems.

Example Determination of Object Response

Preferably, image analyzing device 24, or another device that receives motion, deformation, etc. information from the image analyzing device 24, can obtain and process at least two measurements per cycle of oscillation so that the well-known Nyquist criterion for reconstruction of the periodic response is not violated. In this regard, the measurement in a state of rest described above may be included in the analysis to calculate the periodic response. It will be appreciated that a higher number of object measurements with well-known relative phase positions may increase the accuracy of the measured periodic response, e.g. amplitude and phase of the quantity being measured.

In one embodiment, the synchronization unit 12 can select relative phase positions 13 of the trigger times (represented by rectangular pulses 6, 7) relative to the observed or known oscillation process of excitation unit 22 or the related object 1 being oscillated. In this regard, image analyzing device 24, or another component, can use the measured object motions at each phase and knowledge of the time between each measurement to determine the periodic response of object 1. In another embodiment, the relative phase position for each measurement may be given either by image recording device 3 or by the knowledge of the excitation frequency from excitation unit 22 and/or a sensor 4 deployed in conjunction therewith and time shifts between measurements. Then, the image analyzing device 24 can combine the object motion measurements with the fixed phase shifts to determine the periodic response. In yet another embodiment, a fixed time between measurements may be used. Then, the image analyzing device 24 can combine object motion measurements with the fixed time increments to determine the periodic response. In a still further embodiment, where the relative phase positions are unknown, if the same time increment is used between triggering then it may be possible to solve for the periodic response (amplitude and phase) of the determined quantities, in particular the deformations and the strains in the case of harmonic oscillation processes.

As described, the image analyzing device 24 can use the above object responses in computing or otherwise determining the periodic response of any full-field quantity measured at various times and relative phase positions. Full-field object motion quantities measured by the image analyzing device 24 based on images of object 1 from image recording device 3 may include, but are not limited to: (a) object displacement components; (b) velocity components; (c) acceleration components; (d) surface strain components; and/or (e) mode shape. The displacement, velocity, and acceleration components may be 1D, 2D, or 3D.

In one specific example, as shown in FIG. 3 where a transient load is applied to object 1 (e.g., in the form of a hammer-strike or other impact-based excitation), multiple images can be acquired at a time spacing, $\Delta t$, for determining frequency response of the object 1. The multiple images can be well-focused, sharp images acquired by multiple high speed cameras 3. In addition, the time spacing, $\Delta t$, can be selectable (e.g., configurable) to obtain images at a rate to achieve a level of accuracy in computing related quantities of interest. As shown, a trigger signal (e.g., from a synchronization unit) can have substantially rectangular transient pulses 6 to facilitate acquiring the images using high speed cameras 3 at $\Delta t$. After recording multiple images of the object 1, image analyzing device 24 can perform 3D digital image correlation procedures, as described, to obtain the full-field object motions, surface strains, etc.

By analyzing the multiple images, in this example, the image analyzing device 24 obtains a time history of each of the field displacement components throughout the imaged region. For example, the high speed cameras can allow for obtaining a dense set of temporal data related to the object 1. The image analyzing component 24 can analyze the resulting field displacement data at least in part by reconstructing the frequency response (e.g., using Fast Fourier Transform or other mechanism) based on the field displacement data. For example, image analyzing device 24 can then extract resonant frequencies and reconstruct the individual mode shapes for each resonant frequency at least in part by identifying regions in the frequency response that have high amplitudes (e.g., amplitudes above a threshold, above a threshold difference to other amplitudes, etc.).

Example Non-Periodic Excitation and Response

For non-harmonic oscillations of an object due to non-linear material behavior or variations in structural rigidity, etc., some example embodiments may allow for acquiring a dense set of measurements spanning across one period through control of the relative phase positions during the triggering process. Such cases may employ high speed cameras as image recording device 3 to obtain sufficiently dense data sets. Image analyzing device 24, or another component, may evaluate the amplitudes and phases of the determined quantity of interest during one period of the procedure directly in each case in relation to an arbitrary reference state (e.g., initial rest position or another reference condition, such as zero crossover). Then, the data for quantity of interest may be combined with the fixed time increments to determine the periodic response.

Additional Example Object Response Measurements

The determination of the periodic response for a quantity of interest can be performed in a relatively short time so that the time history of quantities such as the peak-to-peak swing and, if necessary, the phase can be computed rapidly. Image analyzing device 24 or another component may use the results to perform real-time identification of important states of the object, including conditions such as vibratory resonance and maximum strain ranges.

Further, the real-time data computed by the image analyzing device 24 may be used as feedback for automatic active control of the external excitation frequency via the excitation unit 22. The automatic active control may be used to optimize specific input quantities such as force, direction, timing, etc. used by the excitation unit 22. Also, the automatic active control can be used to visit the local maximum or minimum in quantities of interest such as the amplitude of object response or the maximum normal strain used by the excitation unit 22. In another embodiment, the criterion for the automatic or manual search of the resonant frequency may employ gradients in the quantities of interest with frequency change (e.g., $dA/df$ and/or $dP/df$, where A is the amplitude of the object motion and P is the applied external force).

For those cases where the periodic response as a function of phase has been determined, special emphasis may be placed on the reversal points, e.g., at maximum amplitude or minimum amplitude where the object 1 speed is low. At these locations, sharp, clearly focused images may be obtained, analyzed, and presented to the user for visual "stroboscopic"

observation of the object motions. In another embodiment, similar presentations of data may be performed for surface strains, velocities, accelerations and other quantities of interest.

Referring to FIGS. 7-10, methodologies that can be utilized in accordance with various aspects described herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
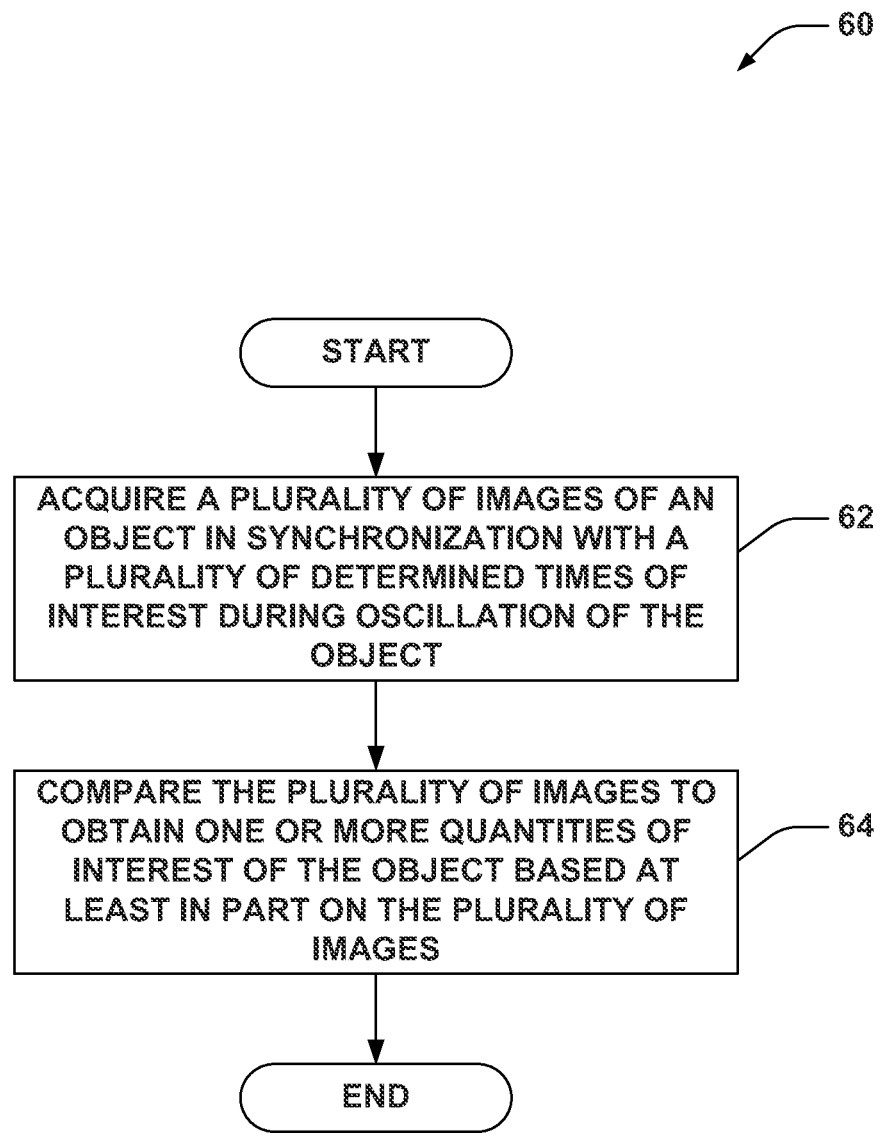
FIG. 7 is an exemplary methodology of comparing images captured in synchronization with oscillation of an object.

FIG. 7 illustrates an example methodology 60 for comparing images of an object acquired in synchronization with oscillation of the object. At 62, a plurality of images of an object are acquired in synchronization with a plurality of determined times of interest during oscillation of the object. In an example, the plurality of images can be acquired by triggering a signal to acquire the images based on received or observed parameters of the object oscillation. For example, signals regarding the oscillation can be received from an excitation unit, motion sensor, etc., and the signal can be triggered to acquire images based on the oscillation parameters (e.g., occurrence of movement, force of the movement, direction of the movement, etc.). In addition, in an example, the excitation unit can be synchronized with the image acquisition. For example, a excitation signal can be sent to the excitation unit to move the object based at least in part on triggering the signal for acquiring images. Furthermore, as described, the object can be illuminated in synchronization with the oscillation and/or image acquiring.

At 64, the plurality of images can be compared to obtain one or more quantities of interest of the object based at least in part on the plurality of images. Comparing the images can include performing image correlation, pattern recognition, etc. on the plurality of images. For example, patterns can be identified on the images, which can relate to random or non-random patters on the object, and movement or motion thereof can be tracked or otherwise determined throughout the plurality of images. In one example, the movement or motion can be analyzed along with a time between images to determine motion quantities, as described. In one example, the patterns can be tracked using images from multiple cameras positioned at different planes, and three-dimensional motion can be computed in this regard. Differences in position of the patterns on the object in the images over a period of time can be used to determine motion, deformations, etc., as described.

Figure 8:
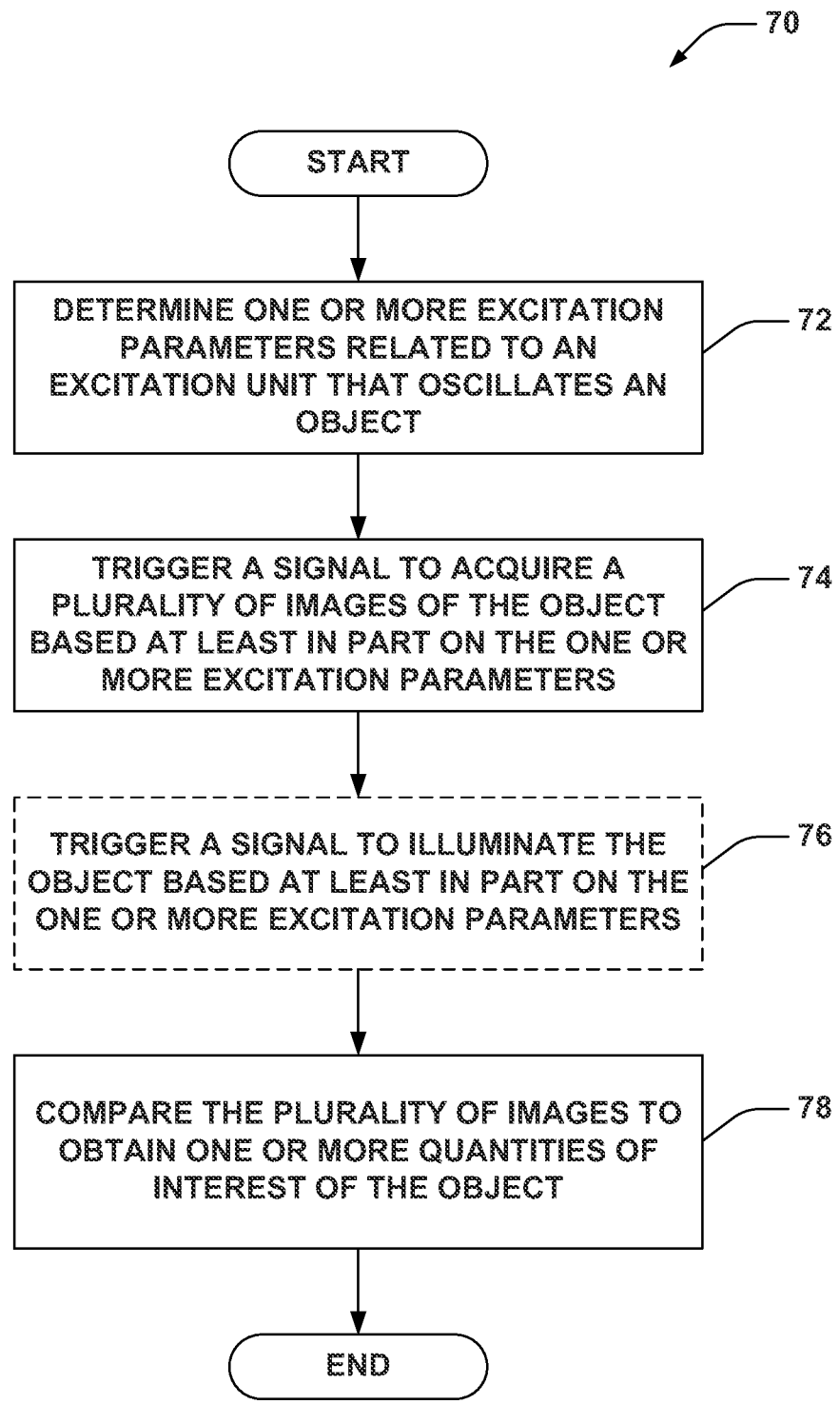
FIG. 8 is an exemplary methodology of triggering imaging and/or illumination based on oscillation of an object.

FIG. 8 illustrates an example methodology 70 for acquiring a plurality of images of an object during oscillation thereof. At 72, one or more excitation parameters related to an excitation unit that oscillates an object can be determined. The one or more excitation parameters can be received from the excitation unit, observed of the excitation unit or object being oscillated (e.g., via a motion sensor, an optical sensor, or substantially any device that detects movement of the unit or object), and/or the like. Moreover, the excitation parameters can relate to an occurrence of a movement of the object, a direction of the movement, a force or velocity of the movement, and/or the like.

At 74, a signal can be triggered to acquire a plurality of images of the object based at least in part on the one or more excitation parameters. In an example, the signals can be triggered upon receiving notification of a movement from the excitation unit or external unit observing the excitation unit. Moreover, the triggered signal can have a pulse width used to specify an exposure time for acquiring a given image, a time interval between pulses to specify a time for acquiring an image, and/or the like. Acquiring images based on excitation unit movements can improve efficiency of capturing and analyzing the images to determine motion, deformation, etc. of the object during oscillation.

At 76, a signal can be optionally triggered to illuminate the object based at least in part on the one or more excitation parameters. For example, the illumination can occur at or near the instant of acquiring the image to freeze the image in time, as described previously. In other examples, the object can be continuously illuminated (e.g., during oscillation thereof). At 78, the plurality of images can be compared to obtain one or more quantities of interest of the object, as described herein.

Figure 9:
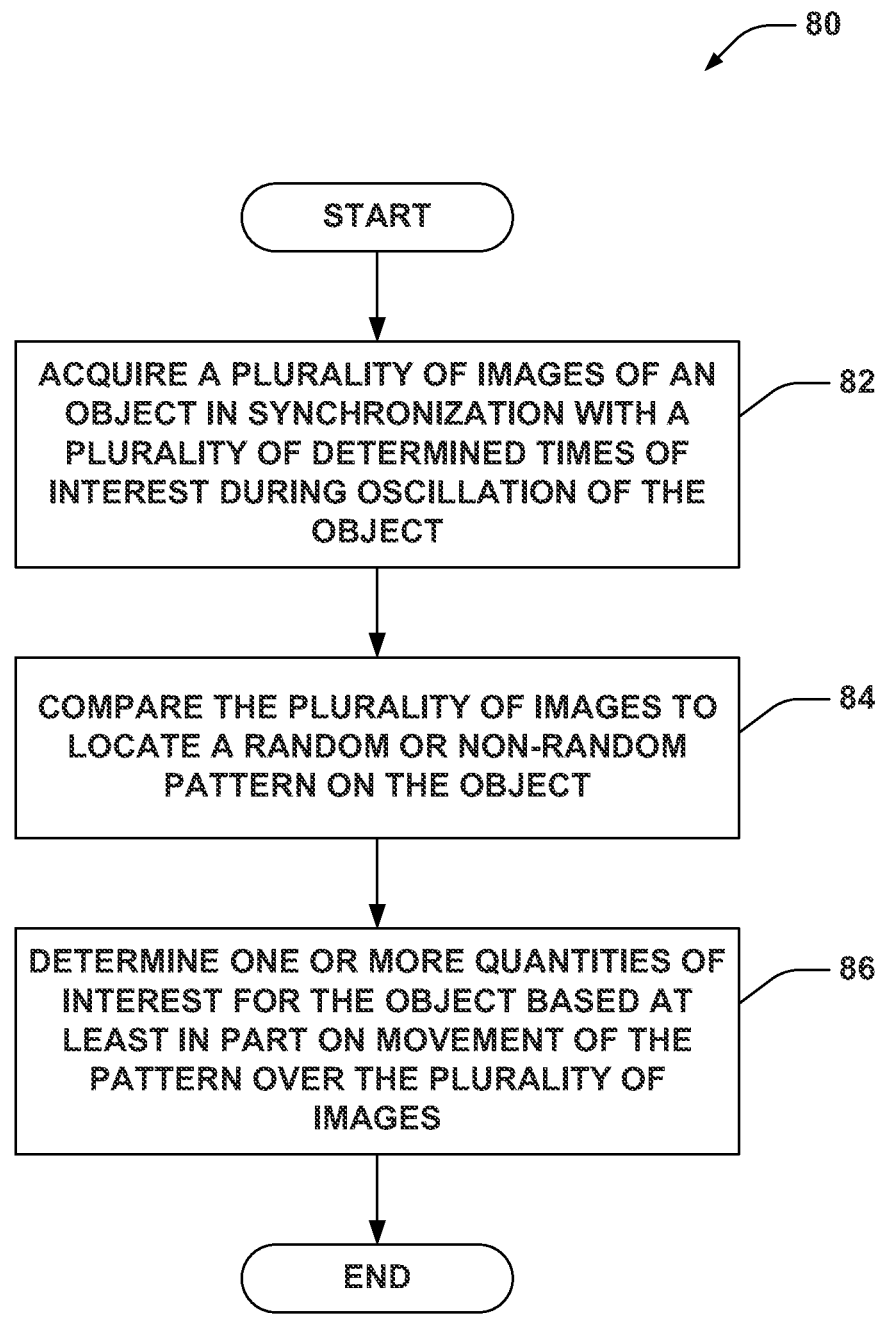
FIG. 9 is an exemplary methodology of locating patterns in a plurality of images of an object.

FIG. 9 illustrates an example methodology 80 for determining quantities of interest for images acquired during oscillation of an object. At 82, a plurality of images of an object are acquired in synchronization with a plurality of determined times of interest during oscillation of the object. As described, the images can be acquired using various association of the timing of acquisition to parameters related to oscillation of the object. At 84, the plurality of images can be compared to locate a random or non-random pattern on the object. For example, the pattern can be naturally occurring or artificially disposed on the object, as described. Thus, for example, comparing the plurality of images from one or more cameras can facilitate determining movement of the pattern in the plurality of images to determine quantities of interest related to the object.

At 86, one or more quantities of interest can be determined for the object based at least in part on movement of the pattern over the plurality of images. Thus, for example, motion of the object can be determined. In addition, the movement can be analyzed along with a known time of the plurality of images to determine velocity of the object, acceleration, etc. As described, the quantities of interest can relate to 2D or 3D processing of the images (e.g., movement of a pattern can be analyzed in images from multiple cameras in 3D processing). In one example, the object can include rigid calibration plates for calibrating cameras that perform the image acquiring and/or analysis devices. In this example, motion, velocity, acceleration, etc. of the plates can be observed as described, and compared to known values for the parameters. Any difference in the parameters can be used to accordingly calibrate the cameras, as described herein.

Figure 10:
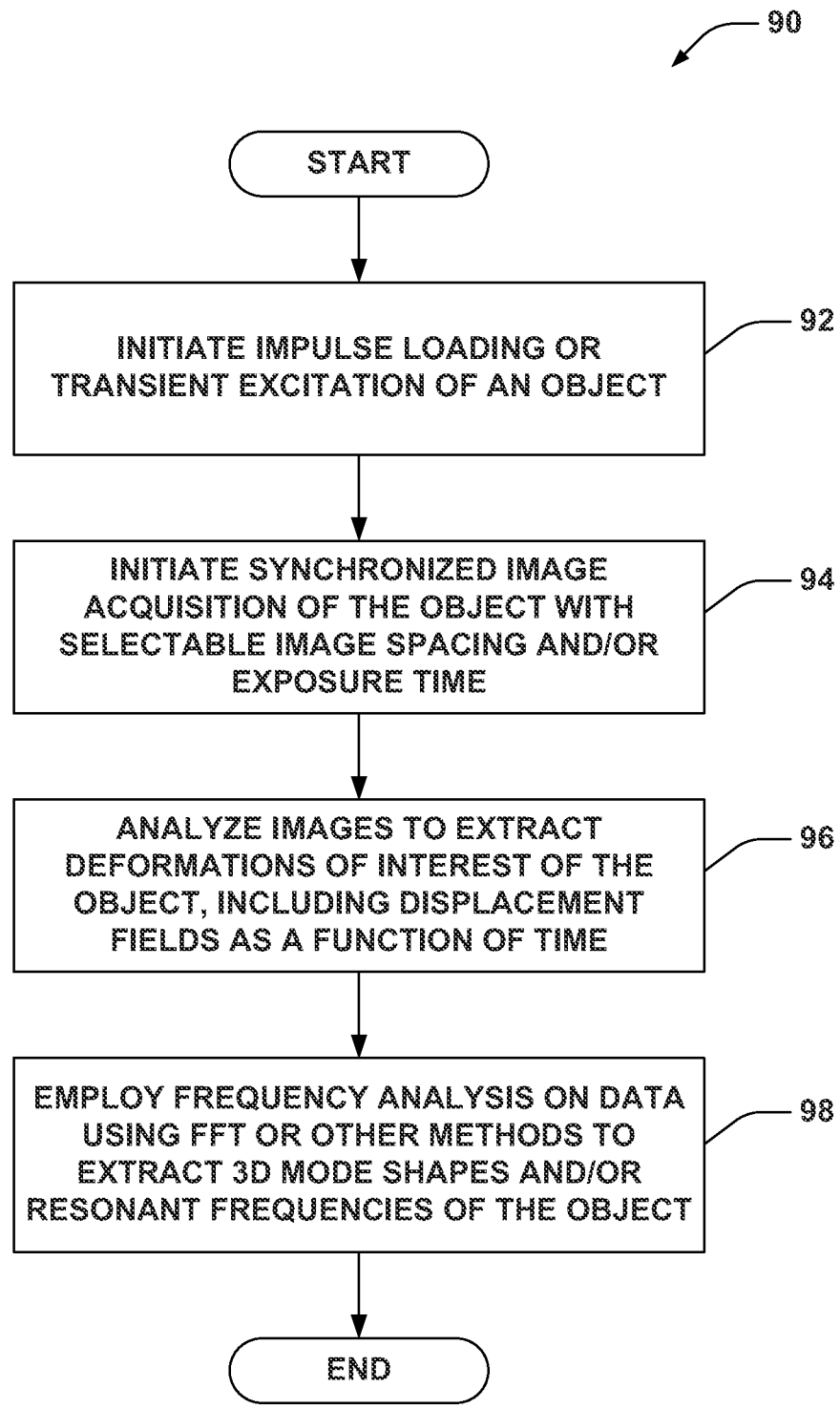
FIG. 10 is an exemplary methodology of locating patterns in a plurality of images of an object.

FIG. 10 illustrates an example methodology 90 for determining mode shape or resonant frequency of an object. At 92, an impulse loading or transient excitation of an object is initiated. This can include impacting, oscillating, vibrating, or other excitation of the object by using an excitation apparatus (e.g., an oscillator, impact hammer, etc.), and/or the like. At 94, synchronized image acquisition of the object can be initiated with a selectable image spacing and/or exposure time. This can include acquiring highly-focused images using a plurality of high-speed cameras aimed at the object at the selectable time spacing and/or exposure time.

At 96, the images are analyzed to extract deformations of interest of the object, including displacement fields as a function of time. This can include performing digital image correlation, as described above, to compare the images to obtain the displacement fields based on known time of acquiring the images. At 98, frequency analysis can be employed on the data using FFT or other methods to extract 3D mode shapes (e.g., shapes in all of 3 directions) and/or resonant frequencies of the object. For instance, once the displacement fields are determined at 96, the FFT can be applied to reconstruct the frequency response, from which the mode shapes can be determined.

Figure 11:
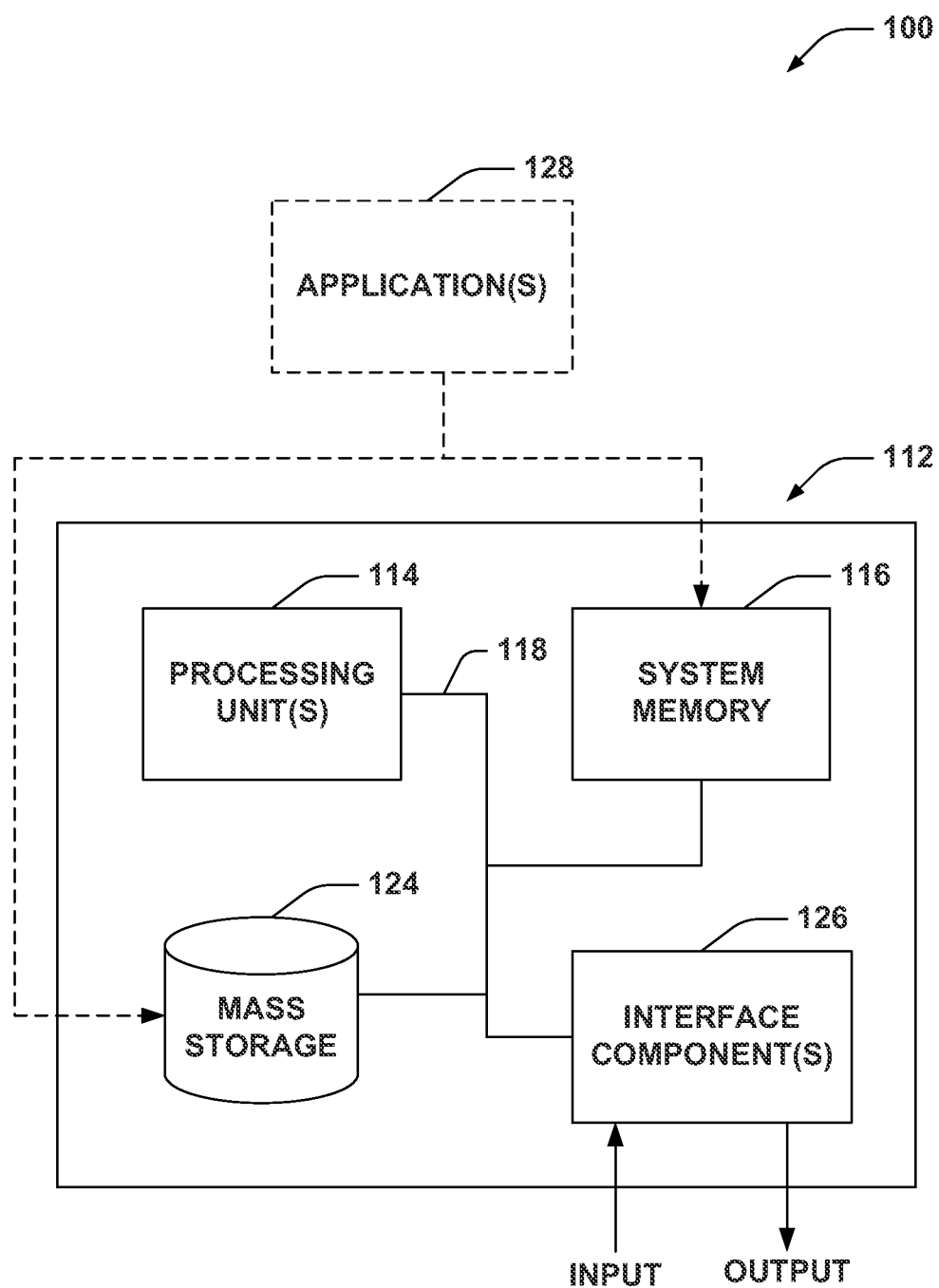
FIG. 11 is an exemplary aspect of an example system in accordance with various aspects described herein.
Figure 12:
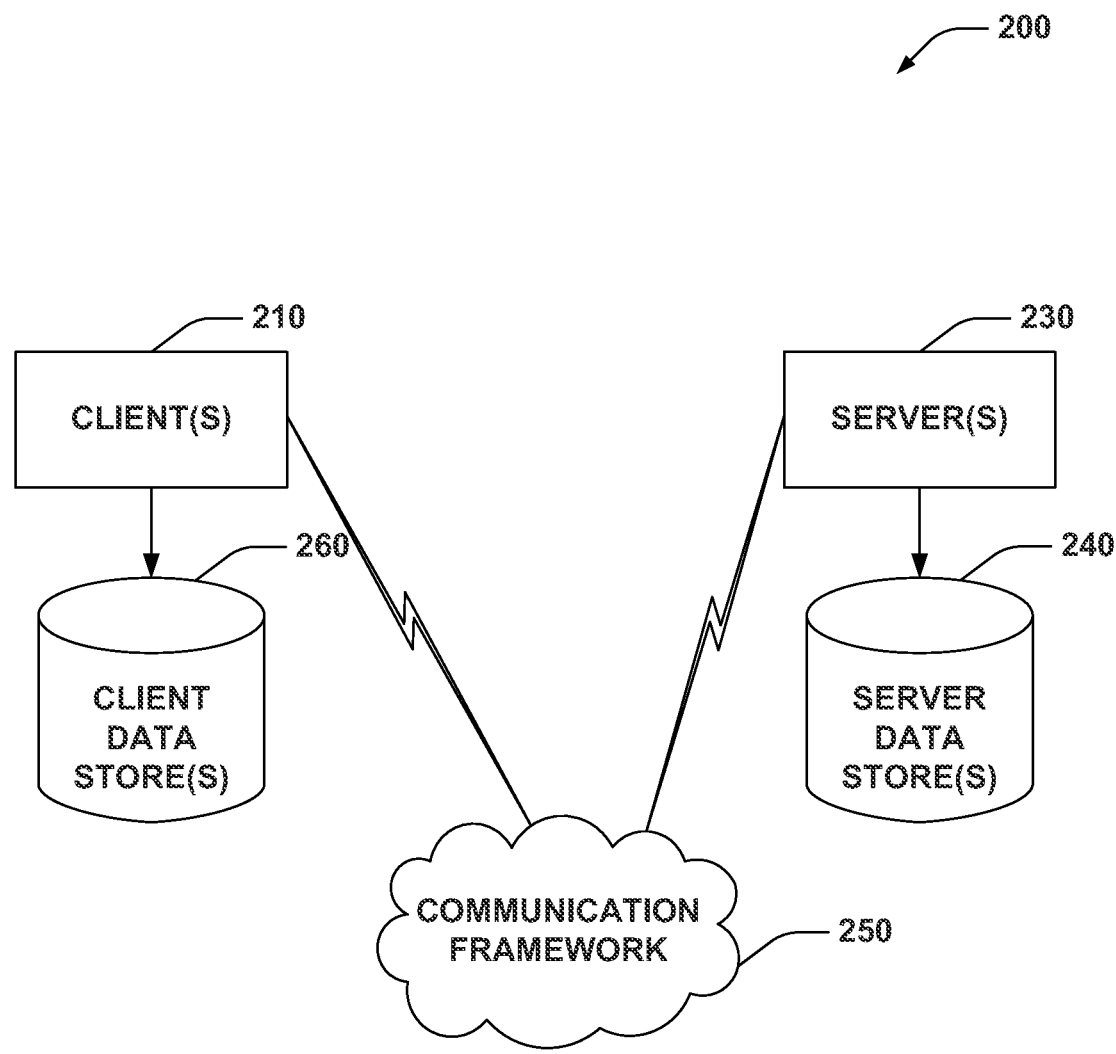
FIG. 12 is an exemplary aspect of an example communication environment in accordance with aspects described herein

To provide a context for the various aspects of the disclosed subject matter, FIGS. 11 and 12 as well as the following discussion are intended to provide a brief, general description of a suitable environment in which the various aspects of the disclosed subject matter may be implemented. While some of the subject matter has been described above in the general context of computer-executable instructions of a program that runs on one or more computers, those skilled in the art will recognize that aspects of the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 100 for implementing various aspects disclosed herein includes a computer 112 (e.g., desktop, laptop, server, hand held, programmable consumer or industrial electronics . . . ). The computer 112 includes a processing unit 114, a system memory 116 and a system bus 118. The system bus 118 couples system components including, but not limited to, the system memory 116 to the processing unit 114. The processing unit 114 can be any of various available microprocessors. It is to be appreciated that dual microprocessors, multi-core and other multiprocessor architectures can be employed as the processing unit 114.

The system memory 116 includes volatile and nonvolatile memory. The basic input/output system (BIOS), containing the basic routines to transfer information between elements within the computer 112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 112 also includes removable/non-removable, volatile/non-volatile computer storage media. FIG. 11 illustrates, for example, mass storage 124. Mass storage 124 includes, but is not limited to, devices like a magnetic or optical disk drive, floppy disk drive, flash memory or memory stick. In addition, mass storage 124 can include storage media separately or in combination with other storage media.

FIG. 11 provides software application(s) 128 that act as an intermediary between users and/or other computers and the basic computer resources described in suitable operating environment 100. Such software application(s) 128 include one or both of system and application software. System software can include an operating system, which can be stored on mass storage 124, that acts to control and allocate resources of the computer system 112. Application software takes advantage of the management of resources by system software through program modules and data stored on either or both of system memory 116 and mass storage 124.

The computer 112 also includes one or more interface components 126 that are communicatively coupled to the bus 118 and facilitate interaction with the computer 112. By way of example, the interface component 126 can be a port (e.g., serial, parallel, PCMCIA, USB, FireWire . . . ) or an interface card (e.g., sound, video, network . . . ) or the like. The interface component 126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 112 to output device(s) via interface component 126. Output devices can include displays (e.g., cathode ray tube (CRT), liquid crystal display (LCD), light emitting diode (LCD), plasma . . . ), speakers, printers and other computers, among other things.

According to an example, computer 112 can perform the image analysis, such as digital image correlation, pattern matching, and/or the like, as described. In this example, the processing unit(s) 114 can comprise or receive instructions related to facilitating analyzing the images or comparing features thereof to determine motion or deformation data, and/or other aspects described herein. It is to be appreciated that the system memory 116 can additionally or alternatively store such instructions and the processing unit(s) 114 can be utilized to process the instructions. In addition, computer 112, or a portion thereof, can be used to perform substantially any of the functions or at least portions of example methodologies 60, 70, and 80, described herein.

FIG. 12 is a schematic block diagram of a sample-computing environment 200 with which the subject innovation can interact. The environment 200 includes one or more client(s) 210. The client(s) 210 can be hardware and/or software (e.g., threads, processes, computing devices). The environment 200 also includes one or more server(s) 230. Thus, environment 200 can correspond to a two-tier client server model or a multi-tier model (e.g., client, middle tier server, data server), amongst other models. The server(s) 230 can also be hardware and/or software (e.g., threads, processes, computing devices). The servers 230 can house threads to perform transformations by employing the aspects of the subject innovation, for example. One possible communication between a client 210 and a server 230 may be in the form of a data packet transmitted between two or more computer processes.

The environment 200 includes a communication framework 250 that can be employed to facilitate communications between the client(s) 210 and the server(s) 230. Here, the client(s) 210 can correspond to program application components and the server(s) 230 can provide the functionality of the interface and optionally the storage system, as previously described. The client(s) 210 are operatively connected to one or more client data store(s) 260 that can be employed to store information local to the client(s) 210. Similarly, the server(s) 230 are operatively connected to one or more server data store(s) 240 that can be employed to store information local to the servers 230.

By way of example, one or more clients 210 can be components of system 20 and/or other components described herein that communicate with server(s) 230 (e.g., to provide determined motion or deformation data regarding the object) over communication framework 250.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise random access memory (RAM), read-only memory (ROM), electrically erasable programmable ROM (EEPROM), compact disc (CD)-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

It can thus be seen that embodiments described herein provide a novel measurement and visualization system and method for measuring object motions, stretches, and distortions or deformations during oscillation of an object. While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. An apparatus for measuring motion or deformations of vibrating objects, comprising:
   an image recording device for acquiring a plurality of images of an object in synchronization with a plurality of determined times of interest during oscillation of the object;
   an image analyzing device for comparing the plurality of images to obtain one or more quantities of interest of the object based at least in part on the plurality of images; and
   an excitation unit for providing oscillation of the object in the form of a broad spectrum oscillation with a predetermined frequency based on transient impulse, wherein the image recording device acquires the plurality of images at different phases with respect to the predetermined frequency.

2. The apparatus of claim 1, further comprising a synchronization unit for determining the plurality of determined times of interest based at least in part on receiving one or more excitation signals related to periodic excitation of the object during oscillation of the object.

3. The apparatus of claim 2, wherein the synchronization unit triggers a signal to the image recording device to synchronously acquire the plurality of images based at least in part on the one or more excitation signals.

4. The apparatus of claim 3, wherein the synchronization unit further triggers an illumination signal to an illuminating device to control illumination of the object for synchronously acquiring the plurality of images based at least in part on the signal or the one or more excitation signals.

5. The apparatus of claim 4, wherein the image recording device uses an exposure time control to freeze the plurality of images in time for acquiring the plurality of images.

6. The apparatus of claim 5, wherein the synchronization unit triggers the signal to the image recording device to control the exposure time control based at least in part on a pulse width of one or more pulses in the signal.

7. The apparatus of claim 4, wherein the synchronization unit triggers the plurality of illumination signals to the illuminating device to control a duration of illumination time based at least in part on a pulse width of one or more pulses in the signal.

8. The apparatus of claim 3, wherein the synchronization unit determines a primary periodic frequency component based at least in part on the one or more excitation signals, and triggers the signal based on the primary periodic frequency component.

9. The apparatus of claim 2, wherein the synchronization unit receives the one or more excitation signals from the excitation unit.

10. The apparatus of claim 2, wherein the synchronization unit receives the one or more excitation signals from a motion sensor that analyzes oscillation of the object by the excitation unit.

11. The apparatus of claim 1, wherein the image recording device uses an exposure time control to freeze the plurality of images in time for acquiring the plurality of images.

12. The apparatus of claim 1, wherein the image recording device comprises one or more standard charge-coupled devices or complementary metal-oxide-semiconductor imagers or other technologies for recording images.

13. The apparatus of claim 1, wherein the image recording device comprises one or more stereo camera systems having a plurality of stereo camera planes directed toward the object.

14. The apparatus of claim 13, wherein the plurality of stereo camera planes are parallel to one another.

15. The apparatus of claim 13, wherein the one or more stereo camera systems are calibrated for determining position of points based at least in part on the image analyzing device determining the quantities of interest of the plurality of images of the object, wherein the object includes one or more rigid body calibration plates.

16. The apparatus of claim 1, further comprising a synchronization unit for determining the plurality of determined times of interest based on a default, manually set, or arbitrary frequency, wherein the synchronization unit triggers a signal to the image recording device at the plurality of determined times to cause acquiring of the plurality of images, and wherein the synchronization unit triggers the excitation unit to oscillate the object based at least in part on the determined times of interest.

17. The apparatus of claim 16, wherein the synchronization unit applies phase shifts to the triggered signal to cause the image recording device to acquire images at discrete phase shifts.

18. The apparatus of claim 17, wherein the synchronization unit triggers the excitation unit to oscillate the object further based at least in part determining local maxima or minima of the previous quantities of interest.

19. The apparatus of claim 16, wherein the synchronization unit triggers the excitation unit to oscillate the object further based at least in part on previous quantities of interest measured by the image analyzing device.

20. The apparatus of claim 1, wherein the image analyzing device compares the plurality of images to match identified points of random or non-random patterns located on the object in the plurality of images to determine the one or more quantities of interest.

21. The apparatus of claim 20, wherein the image analyzing device triangulates matched points in the plurality of images to determine the one or more quantities of interest.

22. The apparatus of claim 20, wherein the image recording device acquires a reference image of the object at rest, and wherein the image analyzing device compares at least a portion of the plurality of images to the reference image to match the identified points.

23. The apparatus of claim 1, wherein the image recording device comprises multiple cameras that each acquire a set of images in the plurality of images, and wherein the image analyzing device compares each set of images from each of the multiple cameras to triangulate matched points of random or non-random patterns located on the object in the plurality of images to determine the one or more quantities of interest for each of the multiple cameras.

24. The apparatus of claim 23, wherein the image analyzing device determines a full-field motion quantity of interest based at least in part on the one or more quantities of interest for each of the multiple cameras.

25. The apparatus of claim 1, wherein the image analyzing device converts the quantities of interest to a coordinate system aligned with an outline of the object or a surface-normal of the object to obtain local measures for the quantities of interest.

26. The apparatus of claim 25, wherein the quantities of interest comprise a displacement of the object, a velocity of the object, an acceleration of the object, a surface strain component of the object, a modal shape of the object, or peak-to-peak swing of the object in one or more directions of the coordinate system.

27. The apparatus of claim 1, wherein the quantities of interest comprise a displacement of the object, a velocity of the object, an acceleration of the object, a surface strain component of the object, a modal shape of the object, or peak-to-peak swing of the object in one or more directions of interest.

28. The apparatus of claim 1, wherein the image analyzing device determines the quantities of interest based at least in part on time shifts between acquiring each of the plurality of images.

29. The apparatus of claim 1, wherein the excitation unit comprises an impact hammer for providing oscillation of the object in the form of hammer-strike.

30. A method for measuring motion or deformations of vibrating objects, comprising:
acquiring a plurality of images of an object in synchronization with a plurality of determined times of interest during oscillation of the object;
comparing the plurality of images to obtain one or more quantities of interest of the object based at least in part on the plurality of images; and
wherein:
the oscillation of the object is performed based on transient loading and the acquiring comprises acquiring the plurality of images using a plurality of high-speed cameras to obtain a dense set of temporal images; and
the one or more quantities of interest include field displacements of the object in one or more directions of interest obtained from the dense set of temporal images.

31. The method of claim 30, further comprising determining the plurality of determined times of interest based at least in part on receiving one or more excitation signals related to periodic excitation of the object during oscillation of the object.

32. The method of claim 31, further comprising triggering a signal to synchronously acquire the plurality of images based at least in part on the one or more excitation signals.

33. The method of claim 32, further comprising triggering an illumination signal to control illumination of the object for acquiring the plurality of images based at least in part on the signal or the one or more excitation signals.

34. The method of claim 32, further comprising triggering the signal to control an exposure time to freeze the plurality of images in time for acquiring the plurality of images.

35. The method of claim 30, further comprising using an exposure time control to freeze the plurality of images in time for acquiring the plurality of images.

36. The method of claim 30, further comprising: triggering an excitation signal to cause oscillation of the object; and triggering a signal to acquire the plurality of images in synchronization with oscillation of the object based on the excitation signal.

37. The method of claim 36, wherein the triggering the signal comprises applying phase shifts to the signal to cause acquiring the plurality of images at discrete phase shifts.

38. The method of claim 37, wherein the triggering the excitation signal is based at least in part on previous quantities of interest measured of a previous plurality of images acquired of the object during a previous oscillation.

39. The method of claim 30, wherein the comparing the plurality of images comprises matching identified points of random or non-random patterns located on the object in the plurality of images to determine the one or more quantities of interest.

40. The method of claim 39, further comprising triangulating matched points in the plurality of images to determine the one or more quantities of interest.

41. The method of claim 39, further comprising acquiring a reference image of the object at rest, and wherein the comparing the plurality of images comprises comparing at least a portion of the plurality of images to the reference image to match the identified points.

42. The method of claim 30 wherein the acquiring the plurality of images comprises acquiring a plurality of sets of images in the plurality of images using multiple cameras, and wherein the comparing the plurality of images comprises comparing each set of images to triangulate matched points of random or non-random patterns located on the object in the set of images to determine the one or more quantities of interest for each set of images.

43. The method of claim 42, further comprising determining a full-field motion quantity of interest based at least in part on the one or more quantities of interest for each set of images.

44. The method of claim 30, further comprising converting the quantities of interest to a coordinate system aligned with an outline of the object or a surface-normal of the object to obtain local measures for the quantities of interest.

45. The method of claim 44, wherein the quantities of interest further comprise a velocity of the object, an acceleration of the object, a surface strain component of the object, a modal shape of the object, or a peak-to-peak swing of the object in one or more directions of the coordinate system.

46. The method of claim 30, wherein the quantities of interest further comprise a velocity of the object, an acceleration of the object, a surface strain component of the object, a modal shape of the object, or a peak-to-peak swing of the object in one or more directions of interest.

47. The method of claim 30, wherein the comparing the plurality of images comprises analyzing time shifts between acquiring each of the plurality of images in obtaining the one or more quantities of interest.

48. The method of claim 30, wherein the comparing the plurality of images comprises obtaining the field displacements in the one or more directions of interest over a time of interest.

* * * * *